United States Patent
Aromin

(10) Patent No.: US 6,738,241 B1
(45) Date of Patent: May 18, 2004

(54) FIREGUARD CIRCUIT

(75) Inventor: Victor V. Aromin, West Warwick, RI (US)

(73) Assignee: Tower Manufacturing Corporation, Providence, RI (US)

( * ) Notice: Subject to any disclaimer, the term of this patent is extended or adjusted under 35 U.S.C. 154(b) by 145 days.

(21) Appl. No.: 10/102,539

(22) Filed: Mar. 27, 2002

(51) Int. Cl.$^7$ .............................................. H02H 31/28
(52) U.S. Cl. .............................. 361/42; 361/45; 361/46
(58) Field of Search .............................. 361/42, 43, 45, 361/46

(56) References Cited

U.S. PATENT DOCUMENTS

| | | | | |
|---|---|---|---|---|
| 4,015,169 A | * | 3/1977 | Misencik | 361/45 |
| 4,194,231 A | * | 3/1980 | Klein | 361/45 |
| 4,378,579 A | * | 3/1983 | Hudson, Jr. | 361/45 |
| 4,598,331 A | * | 7/1986 | Legatti | 361/46 |
| 4,709,293 A | | 11/1987 | Gershen et al. | |
| 5,166,853 A | | 11/1992 | Gershen et al. | |
| 5,177,657 A | * | 1/1993 | Baer et al. | 361/45 |
| 5,185,686 A | | 2/1993 | Hansen et al. | |
| 5,402,298 A | | 3/1995 | Gershen et al. | |
| 5,420,740 A | | 5/1995 | MacKenzie et al. | |
| 5,691,869 A | | 11/1997 | Engel et al. | |
| 5,757,598 A | | 5/1998 | Aromin | |
| 5,889,643 A | | 3/1999 | Elms | |
| 5,963,405 A | | 10/1999 | Engel et al. | |
| 5,963,406 A | | 10/1999 | Neiger et al. | |
| 6,014,297 A | | 1/2000 | Clarey et al. | |
| 6,084,207 A | | 7/2000 | Jones | |
| 6,107,611 A | | 8/2000 | Jones | |
| 6,198,611 B1 | | 3/2001 | Macbeth | |
| 6,229,679 B1 | | 5/2001 | Macbeth | |
| 6,266,219 B1 | | 7/2001 | Macbeth et al. | |
| 6,292,337 B1 | | 9/2001 | Legatti et al. | |

* cited by examiner

Primary Examiner—Bao Q. Vu
(74) Attorney, Agent, or Firm—Kriegsman & Kriegsman

(57) ABSTRACT

A fireguard circuit for a power cable, which comprises a power line, a neutral line and a metal sheath surrounding the power line and the neutral line, includes a switch located in one of the lines. A solenoid sets the switch in either an open position or a closed position. A first silicon controlled rectifier (SCR) causes the solenoid to open the switch upon detecting the presence of an arcing condition between the power line and the metal sheath. A second silicon controlled rectifier (SCR) causes the solenoid to open the switch upon detecting the presence of an arcing condition between the neutral line and the metal sheath. The second SCR is connected in parallel with the first SCR, the anode of the first SCR being connected to the cathode of the second SCR and the cathode of the first SCR being connected to the anode of the second SCR.

19 Claims, 10 Drawing Sheets

FIREGUARD CIRCUIT

BACKGROUND OF THE INVENTION

The present invention relates generally to electrical safety devices and more particularly to electrical safety devices for a power cable.

Conventional electrical appliances typically receive alternating current (AC) power from a power source, such as an electrical outlet, through a power cable. The power cable enables the electrical appliance, or load, to receive from the power source the current necessary to operate.

A power cable typically comprises at least two conducting lines through which current travels from the power source to the load. Specifically, a power cable typically comprises a power line and a neutral line. A metal sheath can be used to surround the power line and the neutral line in order to provide the power cable with arc sensing capabilities.

The connection of an electrical appliance to a power supply through a pair of conducting lines can create a number of potentially dangerous conditions. In particular, there exists the risk of ground fault and grounded neutral conditions in the conducting lines. A ground fault condition occurs when there is an imbalance between the currents flowing in the power and neutral lines. A grounded neutral condition occurs when the neutral line is grounded at the load.

Ground fault circuit interrupters are well known in the art and are commonly used to protect against ground fault and grounded neutral conditions. A ground fault circuit interrupter (GFCI) typically comprises a differential transformer with opposed primary windings, one primary winding being associated with the power line and the other primary winding being associated with the neutral line. If a ground fault condition should occur on the load side of the GFCI, the two primary windings will no longer cancel, thereby producing a flux flow in the core of the differential transformer. This resultant flux flow is detected by a secondary winding wrapped around the differential transformer core. In response thereto, the secondary winding produces a trip signal which, in turn, serves to open at least one of the conducting lines between the power supply and the load, thereby eliminating the dangerous condition.

As an example, in U.S. Pat. No. 5,757,598, to V. V. Aromin, there is disclosed a ground fault circuit interrupter (GFCI) which interrupts the flow of current through a pair of lines extending between a source of power and a load. The GFCI includes a circuit breaker having a switch located in one of the pair of the lines. The switch has a first position in which the source of power in its associated line is not connected to the load and a second position in which the source of power in its associated line is connected to the load. A relay circuit is coupled to the switch for selectively positioning the switch in either the first or second position. The relay circuit includes a solenoid which operates in either an energized or a de-energized state. When energized, the solenoid positions the switch in its second position and when de-energized, the solenoid positions the switch in its first position. The GFCI also includes a booster circuit for selectively supplying a first voltage through the switch and to the solenoid which is sufficient to cause the solenoid to switch from its de-energized state to its energized state. A power supply circuit supplies a second voltage to the solenoid which is less than the first voltage. The second voltage is sufficient to maintain the solenoid in its energized state after being initially energized by the first voltage but is insufficient to switch the solenoid from its de-energized state to its energized state.

A latch circuit operable in first and second bi-stable states allows the solenoid to switch from its de-energized state to its energized state and remain in its energized state when in its first bi-stable state and allowing solenoid to switch from its energized state to its de-energized state and remain in its de-energized state when in its second bi-stable state. A fault detection circuit detects the presence of a fault condition in at least one of the lines extending between the power and the load and causes the latch circuit to latch in its second bi-stable state upon detection of the fault condition.

While GFCI circuits of the type described above are well known and widely used in commerce to protect against ground fault and grounded neutral conditions, it should be noted that a power cable is susceptible to other types of hazardous conditions which are not protected against by a conventional GFCI circuit.

As an example, it has been found that one type of arcing condition can occur between one of the conducting lines and the metal sheath which surrounds the conducting lines. It should be noted that the presence of this type of arcing condition between either the power line and the metal sheath or the neutral line and the metal sheath can result in a fire or other dangerous condition, which is highly undesirable.

Accordingly, in U.S. Pat. No. 4,931,894 to R. Legatti, there is disclosed a ground fault current interrupter circuit (GFCI) which is provided with the additional capacity of detecting and protecting against arcing between a power line and the metal sheath or cover of a power cable. An arc protection winding is located on the core of the GFCI differential transformer and is connected in series with a resistance between the metal sheath and a neutral or return line. By adjusting the number of turns of the arc protection winding and the size of the series resistance, the sensitivity of the arc protection arrangement to arcing current may be set at a desired level.

Although well known in commerce, the GFCI disclosed in Legatti suffers from a notable drawback. Specifically, the GFCI disclosed in Legatti requires a differential transformer in order to detect arcing conditions between the power line and the metal sheath or the neutral line and the metal sheath. As can be appreciated, the implementation of a differential transformer significantly increases the overall size and cost of the product, which is highly undesirable.

SUMMARY OF THE INVENTION

It is an object of the present invention to provide a new and improved safety circuit for a power cable which includes two or more conducting lines and a metal sheath surrounding the conducting lines.

It is another object of the present invention to provide a safety circuit as described above which senses the presence of an arcing condition between one of the conducting lines and the metal sheath, and in response thereto, opens at least one of the conducting lines between the power supply and the load.

It is yet another object of the present invention to provide a safety circuit as described above which may be mass produced, has a minimal number of parts, and can be easily assembled.

Accordingly, in one embodiment of the present invention, there is provided a fireguard circuit for use with a power cable, said power cable connecting a power source with a load, said power cable comprising a power line, a neutral line and a metal sheath which surrounds the power line and the neutral line, said fireguard circuit comprising a circuit breaker comprising a first switch located in one of said lines between the power source and the load, said switch having a first position in which the power source in its associated line is connected to the load and a second position in which the power source in its associated line is not connected to the load, a circuit opening device for setting said switch in either its first position or its second position, said circuit opening device being operable in either a first state or a second state, said circuit opening device setting said switch in its first position when in its first state and said circuit opening device setting said switch in its second position when in its second state, a first silicon controlled rectifier (SCR) for detecting the presence of an arcing condition between the power line and the metal sheath, said first SCR setting said circuit opening device at its second state upon detecting the presence of an arcing condition between the power line and the metal sheath, and a second silicon controlled rectifier (SCR) for detecting the presence of an arcing condition between the neutral line and the metal sheath, said second SCR setting said circuit opening device at its second state upon detecting the presence of an arcing condition between the neutral line and the metal sheath.

Additional objects, as well as features and advantages, of the present invention will be set forth in part in the description which follows, and in part will be obvious from the description or may be learned by practice of the invention. In the description, reference is made to the accompanying drawings which form a part thereof and in which is shown by way of illustration specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. In the drawings wherein like reference numerals represent like parts.

DETAILED DESCRIPTION OF PREFERRED EMBODIMENTS

Figure 1:
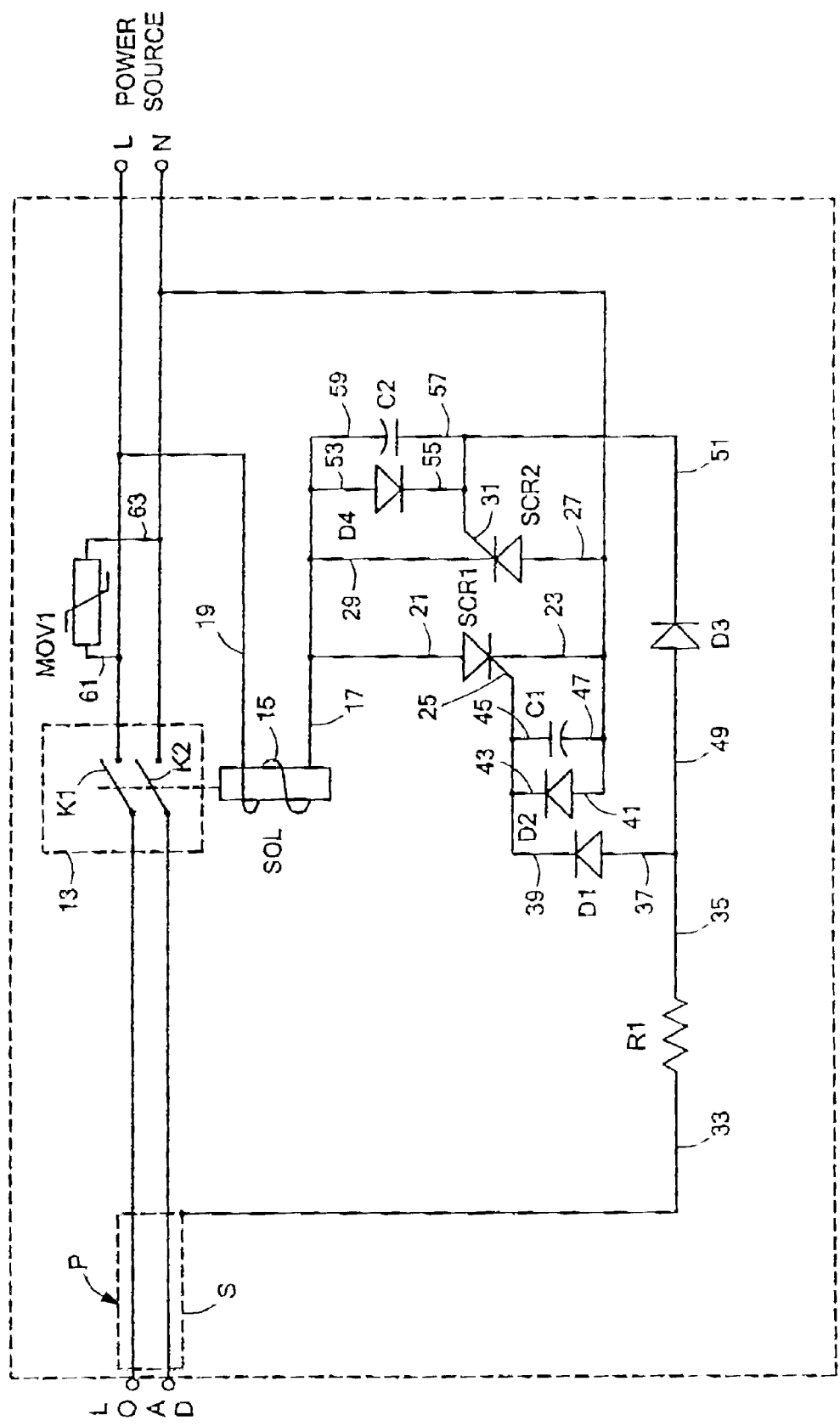
FIG. 1 is a schematic circuit diagram of a first embodiment of a fireguard circuit constructed according to the teachings of the present invention.

Referring now to FIG. 1, there is shown a first embodiment of a fireguard circuit constructed according to the teachings of the present invention, the fireguard circuit being represented generally by reference numeral 11. Fireguard circuit 11 is designed principally for use as a safety device for a power cable P which connects a power source to a load, said power cable P including a power line L and a neutral line N. Each of the power and neutral lines L and N is wrapped with a metal sheath or other similar type of shielded wrapping. The metal sheaths of the power and neutral lines L and N are, in turn, twisted together so as to effectively form a single metal sheath S which surrounds power line L and neutral line N.

As will be discussed in detail below, fireguard circuit 11 interrupts the flow of current through power line L and neutral line N extending between the power source and the load when an arcing condition occurs either between power line L and metal sheath S or between neutral line N and metal sheath S. As can be appreciated, the presence of an arcing condition either between power line L and metal sheath S or between neutral line N and metal sheath S can result in a fire or other dangerous condition, which is highly undesirable.

Fireguard circuit 11 (which is also referred to herein as safety circuit 11) comprises a circuit breaker 13 which selectively opens and closes power line L and neutral line N. Circuit breaker 13 includes a first normally-closed switch K1 which is located in power line L between the power source and the load. Circuit breaker 13 also includes a second normally-closed switch K2 which is located in neutral line N between the power source and the load.

Switches K1 and K2 can be positioned in either of two connective positions. Specifically, switches K1 and K2 can be positioned in either a first, or closed, position or a second, or open, position. With switches K1 and K2 disposed in their closed position, which is the opposite position as illustrated in FIG. 1, current is able to flow from the power source to the load. With switches K1 and K2 disposed in their open position, which is illustrated in FIG. 1, current is unable to flow from the power source to the load.

A solenoid SOL is ganged to the circuit breaker contacts of switches K1 and K2 and is responsible for selectively controlling the connective position of switches K1 and K2. Specifically, when solenoid SOL is de-energized, switches K1 and K2 remain in their closed positions. However, when solenoid SOL is energized, solenoid SOL moves and maintains switches K1 and K2 into their open positions. Solenoid SOL includes a winding 15 which includes a first end 17 and a second end 19, second end 19 being connected to power line L.

It should be noted that fireguard circuit 11 is not limited to the use of solenoid SOL to selectively move and maintain the connective position of switches K1 and K2. Rather, it is to be understood that solenoid SOL could be replaced with alternative types of circuit opening devices which are well known in the art without departing from the spirit of the present invention.

A first silicon controlled rectifier SCR1 acts to detect the presence of an arcing condition between the power line L and the metal sheath S and to switch solenoid SOL from its de-energized state to its energized state upon detecting the presence of the arcing condition between the power line L and the metal sheath S. First silicon controlled rectifier SCR1 preferably has a model number of EC103B and includes an anode 21, a cathode 23 and a gate 25. Anode 21 of first silicon controlled rectifier SCR1 is connected to first end 17 of winding 15.

A second silicon controlled rectifier SCR2 acts to detect the presence of an arcing condition between the neutral line N and the metal sheath S and to switch solenoid SOL from its de-energized state to its energized state upon detecting the presence of the arcing condition between the neutral line N and the metal sheath S. Second silicon controlled rectifier SCR2 preferably has a model number of EC103B and includes an anode 27, a cathode 29 and a gate 31. Anode 27 of second silicon controlled rectifier SCR2 is connected to cathode 23 of first silicon controlled rectifier SCR1. Cathode 29 of second silicon controlled rectifier SCR2 is connected to anode 21 of first silicon controlled rectifier SCR1.

It should be noted that the inclusion and particular connection of rectifiers SCR1 and SCR2 is critical to the proper functioning of the present invention. Specifically, first rectifier SCR1 is disposed in parallel with second rectifier SCR2, with first rectifier SCR1 being disposed in the opposite direction from second rectifier SCR2. Due to the opposite polarities of rectifiers SCR1 and SCR2, only first SCR1 will energize solenoid SOL upon the presence of an arcing condition between hot line L and metal sheath S. Similarly, due to the opposite polarities of rectifiers SCR1 and SCR2, only second rectifier SCR2 will energize solenoid SOL upon the presence of an arcing condition between neutral line N and metal sheath S. As such, with alternating current (AC) power traveling through power cable P, first rectifier SCR1 serves to monitor the positive half of the current cycle and second rectifier SCR2 serves to monitor the negative half of the current cycle, as will be described further below.

A voltage dropping resistor R1 has a value of approximately 1.0 Kohm and includes a first terminal 33 and a second terminal 35. First terminal 33 of resistor R1 is connected to metal sheath S. Accordingly, the presence of an arcing condition between either power line L and metal sheath S or neutral line N and metal sheath S creates a current leakage which travels through resistor R1.

As such, resistor R1 serves to drop the current leakage voltage to an acceptable level before said current leakage voltage is passed onto first and second rectifiers SCR1 and SCR2.

A first isolation diode D1 serves to isolate the gate connection of first rectifier SCR1 for reverse transients. First isolation diode D1 preferably has a model number of IN4004 and includes an anode 37 and a cathode 39. Anode 37 of first isolation diode D1 is connected to second terminal 35 of resistor R1. Cathode 39 of first isolation diode D1 is connected to gate 25 of first rectifier SCR1.

A first protection diode D2 serves to protect the gate connection of first rectifier SCR1 from an overvoltage, or shunt, condition. First protection diode D2 preferably has a model number of IN4004 and includes an anode 41 and a cathode 43. Anode 41 of first protection diode D2 is connected to cathode 23 of first rectifier SCR1. Cathode 43 of first protection diode D2 is connected to gate 25 of first rectifier SCR1.

A first capacitor C1 serves to filter out high frequency noise from passing onto the gate connection of first rectifier SCR1. First capacitor C1 preferably has a value of approximately 0.1 uF and includes a first terminal 45 and a second terminal 47. First terminal 45 of first capacitor C1 is connected to gate 25 of first rectifier SCR1. Second terminal 47 of first capacitor C1 is connected to cathode 23 of first rectifier SCR1.

A second isolation diode D3 serves to isolate the gate connection of second rectifier SCR2 for reverse transients. Second isolation diode D3 preferably has a model number of IN4004 and includes an anode 49 and a cathode 51. Anode 49 of second isolation diode D3 is connected to second terminal 35 of resistor R1. Cathode 51 of second isolation diode D3 is connected to gate 31 of second rectifier SCR2.

A second protection diode D4 serves to protect the gate connection of second rectifier SCR2 from an overvoltage, or shunt, condition. Second protection diode D4 preferably has a model number of IN4004 and includes an anode 53 and a cathode 55. Anode 53 of second protection diode D4 is connected to first end 17 of winding 15. Cathode 55 of second protection diode D4 is connected to gate 31 of second rectifier SCR2.

A second capacitor C2 serves to filter out high frequency noise from passing onto the gate connection of second rectifier SCR2. Second capacitor C2 preferably has a value of approximately 0.1 uF and includes a first terminal 57 and a second terminal 59. First terminal 57 of second capacitor C2 is connected to gate 31 of second rectifier SCR2. Second terminal 59 of second capacitor C2 is connected to first end 17 of winding 15.

A metal-oxide varistor MOV1 protects against voltage surges in power and neutral conducting lines L and H. Metal-oxide varistor MOV1 preferably has a model number of Z151 and includes a first terminal 61 and a second terminal 63. First terminal 61 of metal-oxide varistor MOV1 is connected to power line L and second terminal 63 of metal-oxide varistor MOV1 is connected to neutral line N.

In use, fireguard switch 11 functions in the following manner. In the absence of arcing conditions, switches K1 and K2 are disposed in their normally-closed positions, thereby enabling AC power to pass from the power source to the load through power and neutral lines L and N.

Upon the presence of an arcing condition between power line L and metal sheath S, leakage voltage travels from metal sheath S and passes through resistor R1, resistor R1 dropping the leakage voltage to an acceptable level. The reduced leakage voltage travels through both isolation diodes D1 and D3. However, due to the opposite polarities of rectifiers SCR1 and SCR2, the reduced leakage voltage only triggers gate 25 of first rectifier SCR1 and does not trigger gate 31 of second rectifier SCR2. Specifically, the reduced leakage voltage only triggers gate 25 of rectifier SCR1 because the signal at gate 25 is opposite in potential with respect to the polarity of cathode 23. The triggering of gate 25 causes first rectifier SCR1 to conduct which, in turn, energizes solenoid SOL. Once energized, solenoid SOL opens switches K1 and K2 which, in turn, serves to eliminate the arcing condition, which is highly desirable.

Upon the presence of an arcing condition between neutral line L and metal sheath S, leakage voltage travels from metal sheath S and passes through resistor R1, resistor R1 dropping the leakage voltage to an acceptable level. The reduced leakage voltage travels through both isolation diodes D1 and D3. However, due to the opposite polarities of rectifiers SCR1 and SCR2, the reduced leakage voltage only triggers gate 31 of second rectifier SCR2 and does not trigger gate 25 of first rectifier SCR1. Specifically, the reduced leakage voltage only triggers gate 31 of rectifier SCR2 because the signal at gate 31 is opposite in potential with respect to the polarity of cathode 29. The triggering of gate 31 causes second rectifier SCR2 to conduct which, in turn, energizes solenoid SOL. Once energized, solenoid SOL opens switches K1 and K2 which, in turn, serves to eliminate the arcing condition, which is highly desirable.

It should be noted that fireguard circuit 11 differs from conventional electrical safety devices in that fireguard 1 comprises a pair of opposite polarity silicon controlled rectifiers which are disposed in parallel for sensing the presence of an arcing condition rather than a differential transformer. The fact that fireguard circuit 11 utilizes a pair of silicon controlled rectifiers rather than a differential transformer renders fireguard circuit 11 more compact in size and less expensive to manufacture than conventional electrical safety devices which utilize a differential transformer, which is highly desirable.

Figure 2:
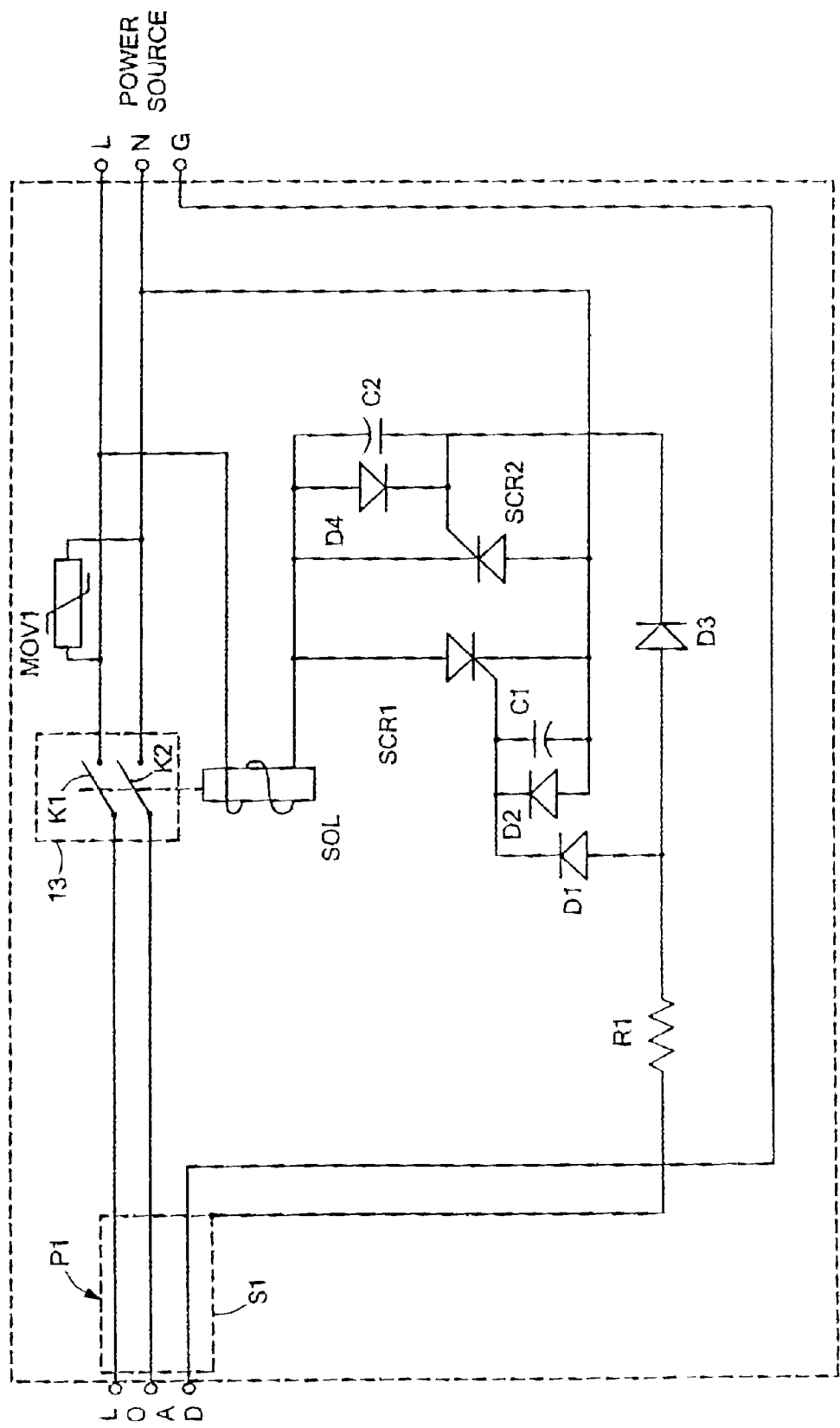
FIG. 2 is a schematic circuit diagram of a second embodiment of a fireguard circuit constructed according to the teachings of the present invention.

It should also be noted that, although fireguard circuit 11 is shown for use as a safety device for a power cable which comprises two conducting lines, it is to be understood that fireguard circuit 11 could also be used as a safety device for a power cable which comprises three conducting lines without departing from the spirit of the present invention. Specifically, referring now FIG. 2, there is shown a second embodiment of a fireguard circuit constructed according to the teachings of the present invention, the fireguard circuit being represented generally by reference numeral 111.

Fireguard circuit 111 (which is also referred to herein as safety circuit 111) is identical in all respects with fireguard circuit 11 except for the fact that fireguard circuit 111 is designed principally for use as a safety device for a power cable P1 which includes three conducting lines whereas fireguard circuit 11 is designed principally for use as a safety device for a power cable P which includes two conducting lines. Specifically, power cable P1 includes a power line L, a neutral line N and a ground line G. Power line L and neutral line N are each wrapped with a metal sheath or other type of similar wrapping. The metal sheaths of power line L and neutral line N are then, in turn, twisted together so as to effectively form a single metal sheath S1 which surrounds power line L and neutral line N. Ground line G remains electrically isolated from power line L and neutral line N.

Figure 3:
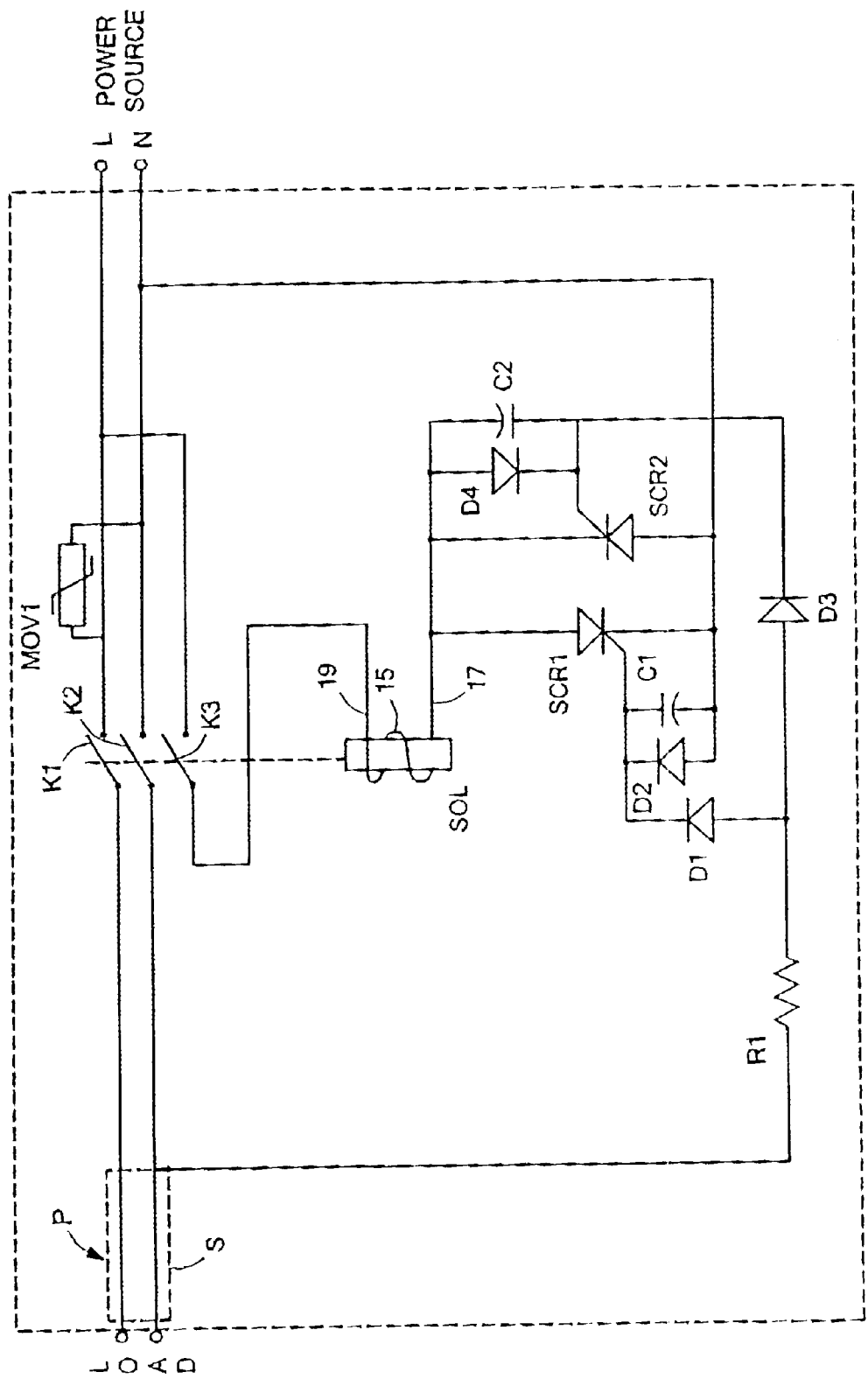
FIG. 3 is a schematic circuit diagram of a third embodiment of a fireguard circuit constructed according to the teachings of the present invention.

Referring now FIG. 3, there is shown a third embodiment of a fireguard circuit constructed according to the teachings of the present invention, the fireguard circuit being represented generally by reference numeral 211.

Fireguard circuit 211 (which is also referred to herein as safety circuit 211) is identical in all respects with fireguard circuit 11 except for the fact that fireguard circuit 111 includes a third normally-closed switch K3 which is located in the line which connects second end 19 of winding 15 to power line L. Solenoid SOL is ganged to third normally-closed switch K3. As a result, solenoid SOL is responsible for selectively controlling the connective position of switches K1, K2 and K3. Specifically, when solenoid SOL is de-energized, switches K1, K2 and K3 remain in their closed positions. However, when solenoid SOL is energized, solenoid SOL moves and maintains switches K1, K2 and K3 into their open positions.

Figure 4:
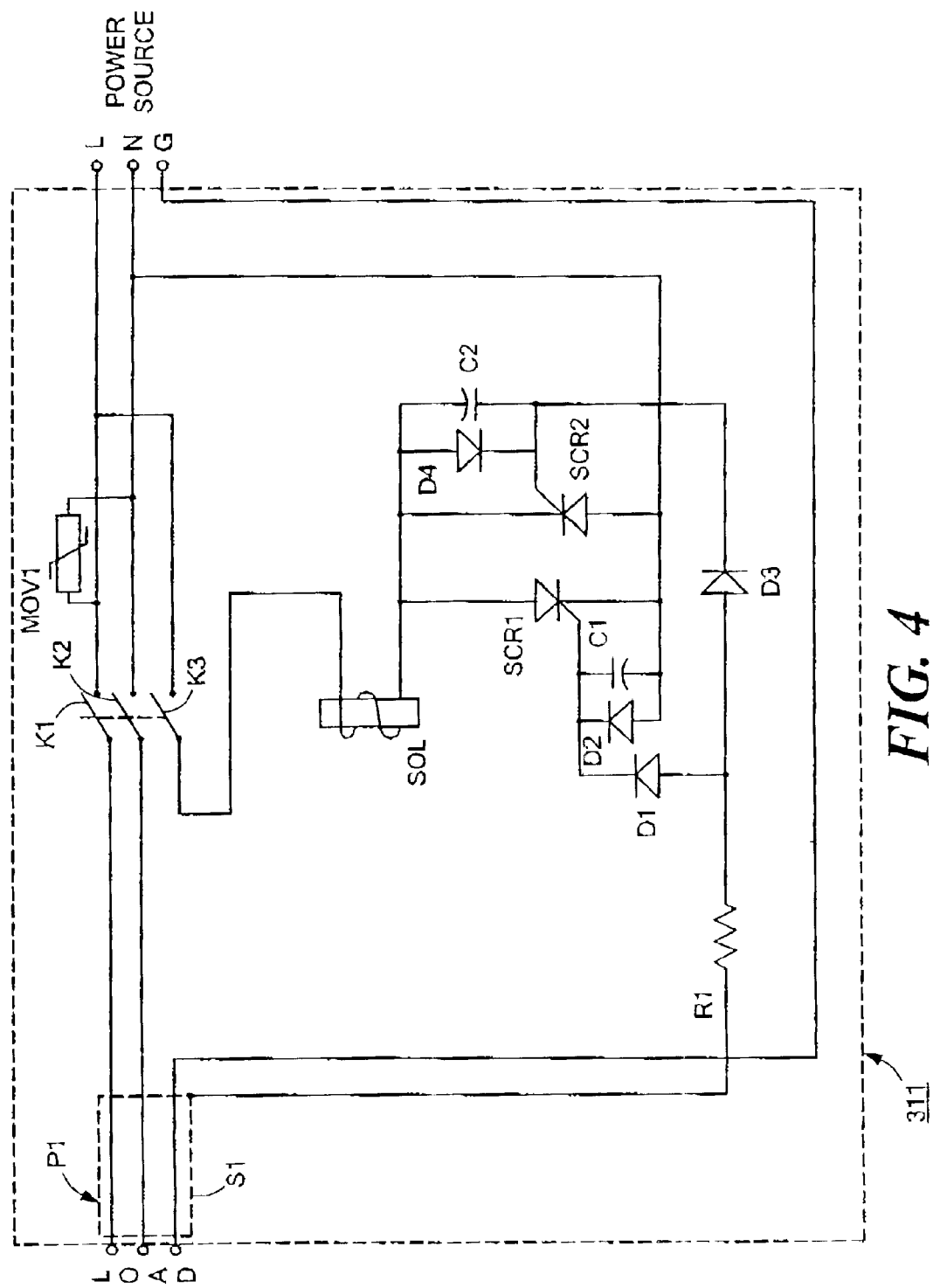
FIG. 4 is a schematic circuit diagram of a fourth embodiment of a fireguard circuit constructed according to the teachings of the present invention.

Although fireguard circuit 211 is shown for use as a safety device for a power cable which comprises two conducting lines, it is to be understood that fireguard circuit 211 could also be used as a safety device for a power cable which comprises three conducting lines without departing from the spirit of the present invention. Specifically, referring now FIG. 4, there is shown a fourth embodiment of a fireguard circuit constructed according to the teachings of the present invention, the fireguard circuit being represented generally by reference numeral 311.

Fireguard circuit 311 (which is also referred to herein as safety circuit 311) is identical in all respects with fireguard circuit 211 except for the fact that fireguard circuit 311 is designed principally for use as a safety device for a power cable P1 which includes three conducting lines whereas fireguard circuit 211 is designed principally for use as a safety device for a power cable P which includes two conducting lines. Specifically, power cable P1 includes a power line L, a neutral line N and a ground line G. Power line L and neutral line N are each wrapped with a metal sheath or other type of similar wrapping. The metal sheaths of power line L and neutral line N and then, in turn, twisted together so as to effectively form a single metal sheath Si which surrounds power line L and neutral line N. Ground line G remains electrically isolated from power line L and neutral line N.

It should be noted that the fireguard circuits shown in FIGS. 1–4 can be combined with alternative types of power cable safety devices without departing from the spirit of the present invention. As an example, the fireguard circuits shown in FIGS. 1–4 could be combined with an appliance leakage current interrupter (ALCI) to form a single power cable safety circuit which would provide ALCI protection as well as protection against arcing between the power line and the metal sheath and/or arcing between the neutral line and the metal sheath.

Figure 5:
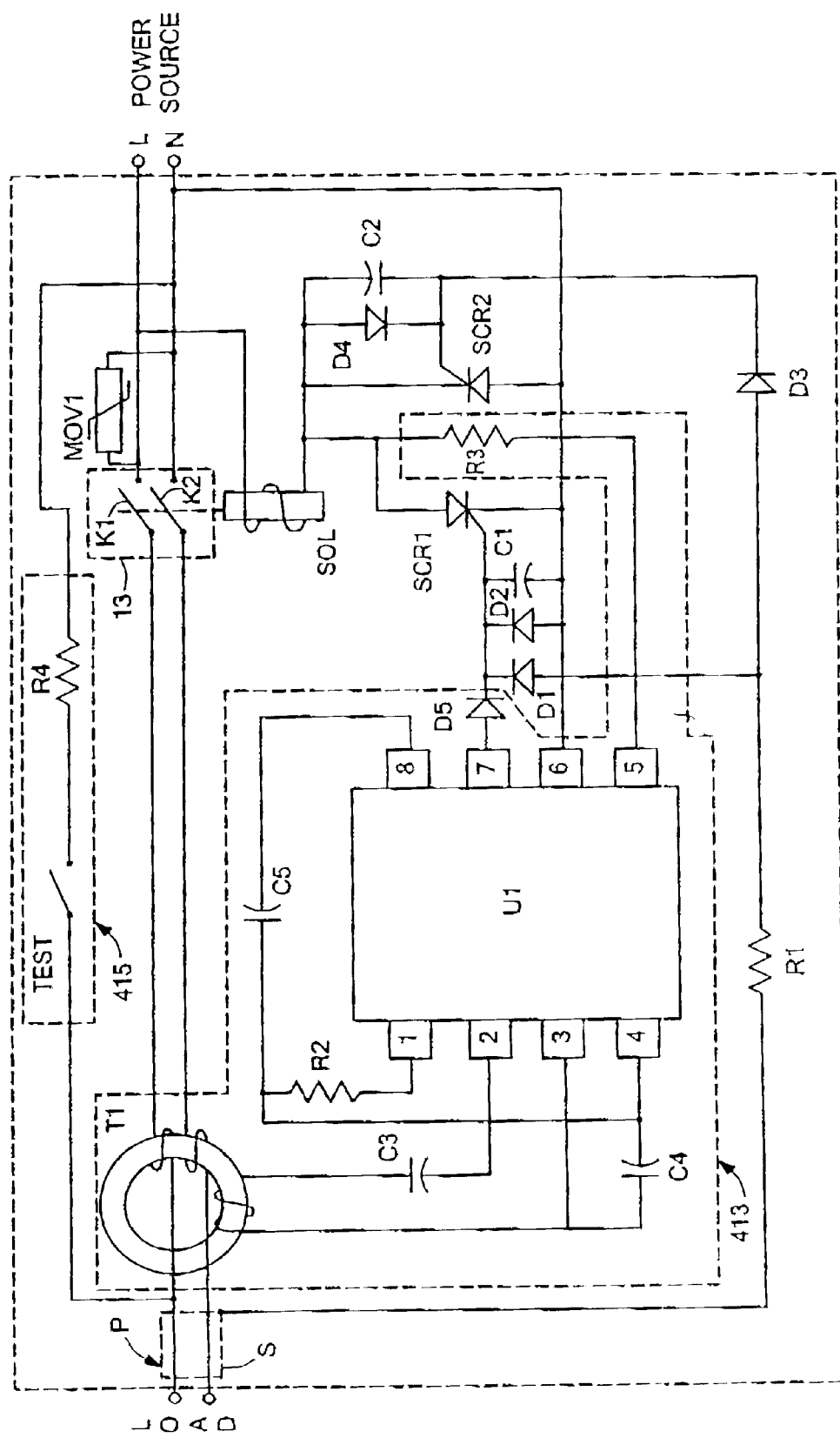
FIG. 5 is a schematic circuit diagram of a first embodiment of a combined fireguard circuit and appliance leakage current interrupter (ALCI) constructed according to the teachings of the present invention.

Specifically, referring now to FIG. 5, there is shown a first embodiment of a combined appliance leakage current interrupter (ALCI)/fireguard circuit constructed according to the teachings of the present invention, the combined ALCI/fireguard circuit being represented generally by reference numeral 411. Combined ALCI/fireguard circuit 411 (which is also referred to herein simply as a safety circuit 411) is designed principally for use as a safety device for a power cable P which connects a power source to a load, said power cable P including a power line L and a neutral line N. Each of the power and neutral lines L and N is wrapped with a metal sheath or other similar type of shielded wrapping. The metal sheaths of the power and neutral lines L and N are, in turn, twisted together so as to effectively form a single metal sheath S which surrounds power line L and neutral line N.

Combined ALCI/fireguard circuit 411 is similar to fireguard circuit 11 in that combined ACLI/fireguard circuit 411 comprises circuit breaker 13, first silicon controlled rectifier SCR1, second silicon controlled rectifier SCR2, voltage dropping resistor R1, first isolation diode D1, first protection diode D2, first capacitor C1, second isolation diode D3, second protection diode D4, second capacitor C2 and metal-oxide varistor MOV1 which are all connected in the same manner as in fireguard circuit 11.

Combined ALCI/fireguard circuit 411 differs from fireguard circuit 11 in that combined ALCI/fireguard circuit 411 additionally comprises a fault detection circuit 413 and a test circuit 415.

Fault detection circuit 413 serves to detect the presence of ground fault conditions in the power and neutral conductive lines L and N. Fault detection circuit 413 comprises a sense transformer T1, a ground fault interrupter chip U1, a protection diode D5, capacitors C3, C4 and C5, and resistors R2 and R3.

Ground fault interrupter chip U1 is preferably an RV4140 ground fault interrupter circuit sold by Raytheon® Corporation. Ground fault interrupter chip U1 serves to amplify the fault signal generated by transformer and provide an output pulse at pin 5 of chip U1 which, in turn, energizes solenoid SOL. Protection diode D5 preferably has a model number of IN4004 and serves to protect ground fault interrupter chip U1. Capacitor C3 has a value of approximately 22.0 uF, capacitor C4 has a value of approximately 0.1 uF and capacitor C5 has a value of approximately 0.02 uF. Resistor R2 has a value in the range of approximately 100–470 Kohms and resistor R3 has a value of approximately 82 Kohms.

Fault detection circuit 413 represents any conventional ALCI fault detection circuit which is used to detect the presence of a ground fault condition. Accordingly, it is to be understood that fault detection circuit 413 could be replaced with alternative types of conventional ALCI fault detection circuits which are used to detect the presence of a ground fault condition without departing from the spirit of the present invention.

Test circuit 415 provides a means of testing whether circuit 411 is functioning properly. Test circuit 415 comprises a current limiting resistor R4 having a value of approximately 15 Kohms and a test switch TEST. When test switch TEST is closed, resistor R4 provides a simulated fault current to transformer T1 which is similar to a ground fault condition.

Figure 6:
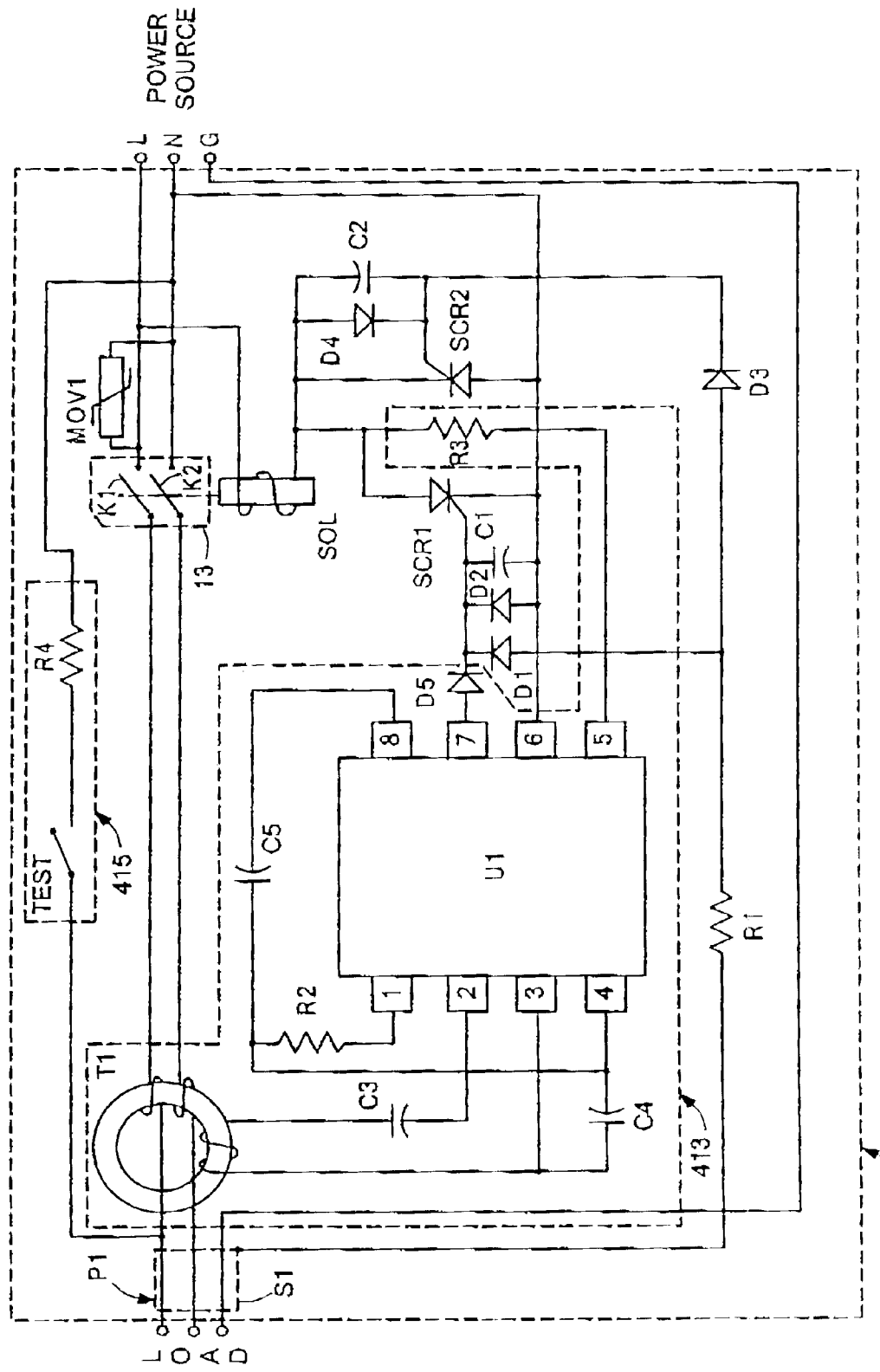
FIG. 6 is a schematic circuit diagram of a second embodiment of a combined fireguard circuit and appliance leakage current interrupter (ALCI) constructed according to the teachings of the present invention.

It should also be noted that, although the combined ALCI/fireguard circuit 411 is shown for use as a safety device for a power cable which comprises two conducting lines, it is to be understood that the combined ALCI/fireguard circuit 411 could also be used as a safety device for a power cable which comprises three conducting lines without departing from the spirit of the present invention. Specifically, referring now FIG. 6, there is shown a second embodiment of a combined ALCI/fireguard circuit constructed according to the teachings of the present invention, the combined ALCI/fireguard circuit being represented generally by reference numeral 511.

Combined ALCI/fireguard circuit 511 (which is also referred to herein simply as safety circuit 511) is identical in all respects with combined ALCI/fireguard circuit 411 except for the fact that combined ALCI/fireguard circuit 511 is designed principally for use as a safety device for a power cable P1 which includes three conducting lines whereas combined ALCI/fireguard circuit 411 is designed principally for use as a safety device for a power cable P which includes two conducting lines. Specifically, power cable P1 includes a power line L, a neutral line N and a ground line G. Power line L and neutral line N are each wrapped with a metal sheath or other type of similar wrapping. The metal sheaths of power line L and neutral line N are then, in turn, twisted together so as to effectively form a single metal sheath Si which surrounds power line L and neutral line N. Ground line G remains electrically isolated from power line L and neutral line N.

As noted briefly above, fault detection circuit 413 of combined ALCI/fireguard circuit 411 represents any conventional ALCI fault detection circuit which is used to detect the presence of a ground fault condition. As such, it is to be understood that fault detection circuit 413 could be replaced with alternative types of conventional ALCI fault detection circuits which are used to detect the presence of a ground fault condition without departing from the spirit of the present invention.

Figure 7:
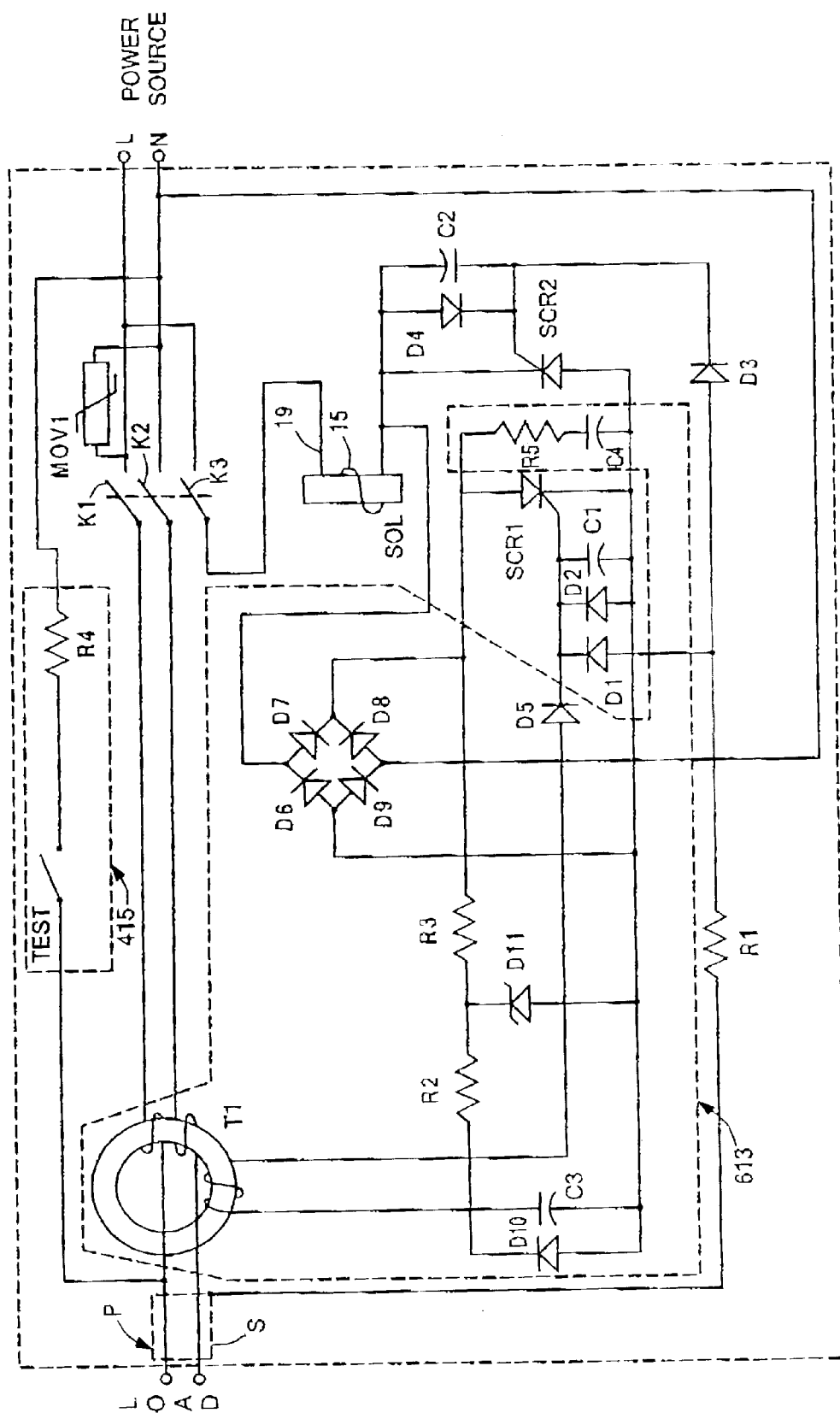
FIG. 7 is a schematic circuit diagram of a third embodiment of a combined fireguard circuit and appliance leakage current interrupter (ALCI) constructed according to the teachings of the present invention.

Specifically, referring now to FIG. 7, there is shown a third embodiment of a combined appliance leakage current interrupter (ALCI) and fireguard circuit constructed according to the teachings of the present invention, the combined ALCI/fireguard circuit being represented generally by reference numeral 611.

Combined ALCI/fireguard circuit 611 (which is also referred to herein simply as safety circuit 611) differs from combined ALCI/fireguard circuit 411 in that combined ALCI/fireguard circuit 611 comprises a fault detection circuit 613 which differs in construction from fault detection circuit 413. Specifically, fault detection circuit 613 differs from fault detection circuit 413 in that fault detection circuit is a direct drive ALCI fault detection circuit.

Fault detection circuit 613 functions similarly to fault detection circuit 413 in that fault detection circuit 613 serves to detect the presence of ground fault conditions in the power and neutral conductive lines L and N. Fault detection circuit 613 comprises a sense transformer T1, diodes D5, D6, D7, D8, D9, D10 and D11, capacitors C3 and C4, and resistors R2, R3 and R5.

Diodes D5, D6, D7, D8 and D9 all preferably have a model number of IN4004, diodes D6, D7, D8 and D9 together forming a bridge rectifier. Diode D10 preferably has a model number of IN4148. Diode D11 is preferably a 5.6 volt zener diode. Capacitor C3 has a value of approximately 2.2 uF and capacitor C4 has a value of approximately 0.01 uF. Resistor R2 has a value in the range of approximately 330 Kohms-1.5 Mohms, resistor R3 has a value of approximately 150 Kohms and resistor R5 has a value of approximately 100 Kohms.

It should be noted that the only other difference between combined ALCI/fireguard circuit 611 and combined ALCI/fireguard circuit 411 is that combined ALCI/fireguard circuit 611 includes a third normally-closed switch K3 which is located in the line which connects second end 19 of winding 15 to power line L. Solenoid SOL is ganged to third normally-closed switch K3. As a result, solenoid SOL is responsible for selectively controlling the connective position of switches K1, K2 and K3. Specifically, when solenoid SOL is de-energized, switches K1, K2 and K3 remain in their closed positions. However, when solenoid SOL is energized, solenoid SOL moves and maintains switches K1, K2 and K3 into their open positions.

Figure 8:
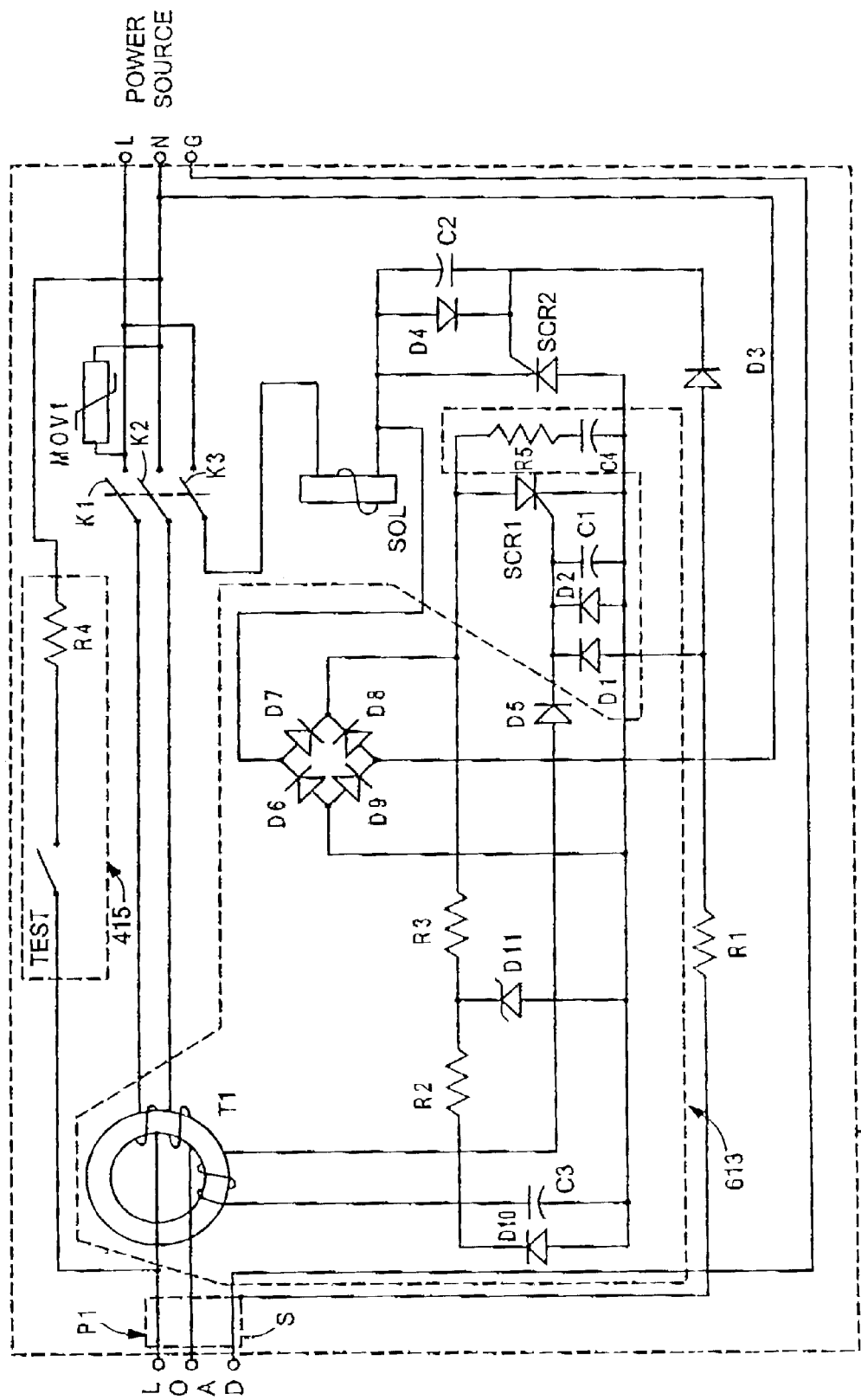
FIG. 8 is a schematic circuit diagram of a fourth embodiment of a combined fireguard circuit and appliance leakage current interrupter (ALCI) constructed according to the teachings of the present invention.

It should also be noted that, although the combined ALCI/fireguard circuit 611 is shown for use as a safety device for a power cable which comprises two conducting lines, it is to be understood that the combined ALCI/fireguard circuit 611 could also be used as a safety device for a power cable which comprises three conducting lines without departing from the spirit of the present invention. Specifically, referring now FIG. 8, there is shown a second embodiment of a combined ALCI/fireguard circuit constructed according to the teachings of the present invention, the combined ALCI/fireguard circuit being represented generally by reference numeral 711.

Combined ALCI/fireguard circuit 711 (which is also referred to herein simply as safety circuit 711) is identical in all respects with combined ALCI/fireguard circuit 611 except for the fact that-combined ALCI/fireguard circuit 711 is designed principally for use as a safety device for a power cable P1 which includes three conducting lines whereas combined ALCI/fireguard circuit 611 is designed principally for use as a safety device for a power cable P which includes two conducting lines. Specifically, power cable P1 includes a power line L, a neutral line N and a ground line G. Power line L and neutral line N are each wrapped with a metal sheath or other type of similar wrapping. The metal sheaths of power line L and neutral line N are then, in turn, twisted together so as to effectively form a single metal sheath S1 which surrounds power line L and neutral line N. Ground line G remains electrically isolated from power line L and neutral line N.

As noted above, the fireguard circuits shown in FIGS. 1–4 can be combined with alternative types of power cable safety devices without departing from the spirit of the present invention. As an example, the fireguard circuits shown in FIGS. 1–4 could be combined with a ground fault circuit interrupter (ALCI) to form a single power cable safety circuit which would provide GFCI protection as well as protection against arcing between the power line and the metal sheath and/or arcing between the neutral line and the metal sheath.

Figure 9:
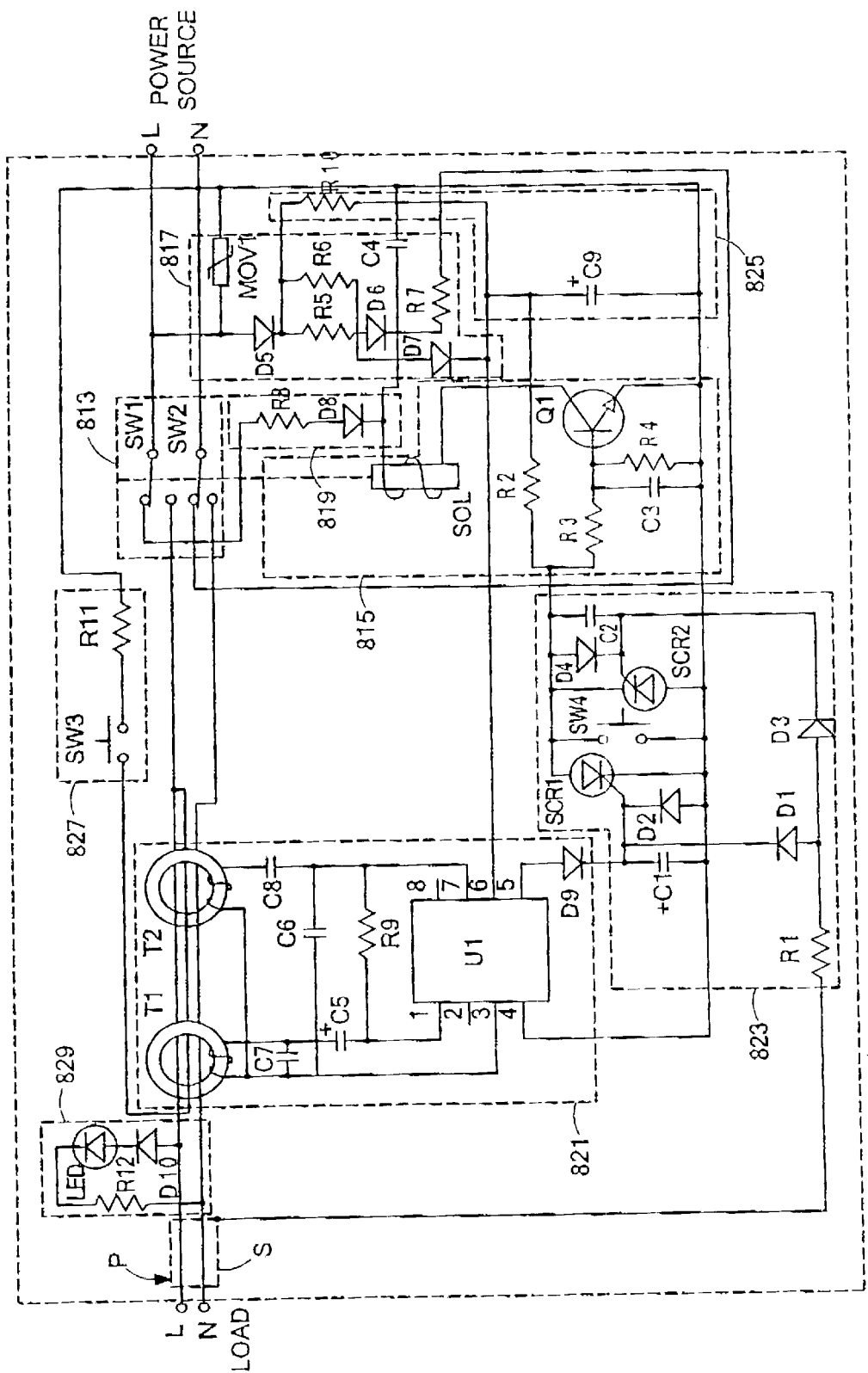
FIG. 9 is a schematic circuit diagram of a first embodiment of a combined fireguard circuit and ground fault circuit interrupter (GFCI) constructed according to the teachings of the present invention.

Specifically, referring now to FIG. 9, there is shown a first embodiment of a combined ground fault circuit interrupter (GFCI) and fireguard circuit constructed according to the teachings of the present invention, the combined GFCI/fireguard circuit being represented generally by reference numeral 811. Combined GFCI/fireguard circuit 811 (which is also referred to herein simply as safety circuit 811) is designed principally for use as a safety device for a power cable P which connects a power source to a load, said power cable P including a power line L and a neutral line N. Each of the power and neutral lines L and N is wrapped with a metal sheath or other similar type of shielded wrapping. The metal sheaths of the power and neutral lines L and N are, in turn, twisted together so as to effectively form a single metal sheath S which surrounds power line L and neutral line N.

Combined GFCI/fireguard circuit 811 includes a circuit breaker 813, a relay circuit 815, a power supply circuit 817, a booster circuit 819, a fault detection circuit 821, an arc detection/latching circuit 823, a filter circuit 825, a test circuit 827 and an indicator circuit.829.

Circuit breaker 813 includes a pair of single-pole, double throw switches SW1 and SW2 which are located in the power and neutral conductive lines, respectively, between the power source and the load. Circuit breaker 813 acts to selectively open and close the pair of conductive lines. Switches SW1 and SW2 can be positioned in either of two connective positions. In the first connective position, which is illustrated in FIG. 9, switches SW1 and SW2 are positioned such that the power source is not connected to the load but is connected to booster circuit 819. In the second connective position, which is opposite the position illustrated in FIG. 9, switches SW1 and SW2 are positioned such that the power source is connected to the load instead of booster circuit 819. In both positions, the power source is connected to power supply 817.

Relay circuit 815 acts to selectively position switches SW1 and SW2 in either its first connective position or its second connective position. Relay circuit 815 comprises a solenoid SOL, a transistor Q1, a load resistor R2, a pair of voltage divider resistors R3 and R4, and a noise suppression capacitor C3.

Solenoid SOL is ganged to the circuit breaker contacts of switches SW1 and SW2 and is responsible for selectively controlling the connective position of switches SW1 and SW2. Before power is applied to circuit 811, solenoid SOL positions switches SW1 and SW2 in their first connective position. After power is applied to circuit 811, switches SW1 and SW2 will remain in their first connective position. When solenoid SOL is energized, solenoid SOL positions switches SW1 and SW2 in their second connective position.

Transistor Q1 is preferably an MPSA42 transistor sold by Motorola® Corporation and acts to control the current supplied to energize solenoid SOL. When transistor Q1 is off, current cannot flow through solenoid SOL. On the other hand, when transistor Q1 is on, current can flow through solenoid SOL1. Load resistor R2 has a value of 4.7 Kohms. Voltage divider resistors R3 and R4 each have a value of 22 Kohms and together act to provide the necessary base current to enable transistor Q1 to turn on. Noise suppression capacitor C3 has a value of 0.1 uF and acts to filter out noise in circuit 811.

Power supply circuit 817 acts to provide power for circuit 811. Power supply circuit 817 comprises a metal oxide varistor MOV1, a silicon rectifier D5, a pair of voltage dropping resistors R5 and R6, a filter capacitor C4, a bleeder resistor R7, a silicon rectifier D6 and a silicon rectifier D7. Varistor MOV1 has a model number of Z151 and acts to protect against a voltage surge from the AC power source. Silicon rectifier D5 is preferably has a model number of IN4005 and acts to convert AC current in the line from the power source into a DC current. Voltage dropping resistors R5 and R6 each have a value in the range of 10 Kohms to 11 Kohms and together act to limit the constant input voltage supplied to solenoid SOL1. Filter capacitor C4 has a value of 22 uF and acts to filter the constant voltage supplied to solenoid SOL. Bleeder resistor R7 has a value of 100 Kohms and acts to bleed the charge of capacitor C4 when the load is unplugged from the power source. Silicon rectifier D6 preferably has a model number of IN4005 and acts to prevent the DC voltage surged provided by booster circuit 819 from entering into other parts of circuit 11. Silicon rectifier D7 preferably has a model number of IN4005 and acts as a voltage regulator for solenoid SOL and acts to speed up the charge in filter circuit 825 for quick filtering.

Booster circuit 819 acts to provide a temporary voltage sufficient to initially energize solenoid SOL from its de-energized state. Booster circuit 819 comprises a silicon rectifier D8 and a surge limit resistor R8. Rectifier D8 is preferably has a model number of IN4005 and acts to convert the AC power in the line of power source to DC power. When switch SW1 is in its first position and upon the application of power to circuit 811, rectifier D8 provides an instant DC voltage to solenoid SOL which, in turn, causes solenoid SOL to energize. Energizing of solenoid SOL moves switches SW1 and SW2 to their second connective position. When switches SW1 and SW2 are moved to their second connective position, booster circuit 819 is disconnected from the power source. Resistor R8 has a value of 47 Kohms and acts to protect rectifier D8 and capacitor C4 from overcurrents.

Fault detection circuit 821 acts to detect both ground fault and grounded neutral conditions in the conductive lines when switches SW1 and SW2 are in their second connective position. Fault detection circuit 821 comprises a sense transformer T1, a grounded neutral transformer T2, a coupling capacitor C5, a pair of noise suppression capacitors C6 and C7, a tuning capacitor C8, a feedback resistor R9, a protection diode D9 and a ground fault interrupter chip U1. Transformer T1 is preferably a C-5029-01-00 transformer sold by Magnetic Metals and transformer T2 is preferably a F-3006-01 transformer sold by Magnetic Metals. Sense transformer T1 senses the current differential between the power and neutral conductive lines, and upon the presence of a ground fault condition, transformer T1 induces an associated output from its secondary windings. Grounded neutral transformer T2 acts in conjunction with transformer T1 to sense the presence of grounded neutral conditions and, in turn, induce an associated output. Coupling capacitor C5 has a value of 47 uF and acts to couple the AC signal from the secondary winding of transformer T1 to chip U1. Noise suppression capacitor C6 has a value of 4700 pF and noise suppression capacitor C7 has a value in the range of 500 pF to 0.022 uF. Together capacitors C6 and C7 act to prevent fault detection circuit 821 from operating in response to line disturbances such as electrical noise and lower level faults. Tuning capacitor C8 has a value of 0.033 uF and feedback resistor R9 has a value in the range of 680 Kohms to 1.5 Mohms. Together capacitor C8 and resistor R9 act to set the minimum fault current at which fault detection circuit 821 provides an output signal to latch circuit 823. Interrupter chip U1 is preferably an RV4145 low power ground fault interrupter circuit sold by Raytheon Corporation. Chip U1 serves to amplify the fault signal generated by transformer T1 and provide an output pulse on pin 5 to activate latch circuit 823. Protection diode D9 preferably has a model number of IN4004 and serves to chip U1 from reverse transients.

Arc detection/latching circuit 823 serves two principal functions: (1) to take the electrical signal produced by fault detection circuit 821 and, in turn, de-energize solenoid SOL and (2) to detect the presence of an arcing condition between power line L and metal sheath S or neutral line N and metal sheath S and, in turn, de-energize solenoid SOL. Arc detection/latching circuit 823 comprises first silicon controlled rectifier SCR1, second silicon controlled rectifier SCR2, voltage dropping resistor R1, first and second isolation diodes D1 and D3, first and second protection diodes D2 and D4, capacitors C1 and C2 and a reset switch SW4. First rectifier SCR1 preferably has a model number of IN4005 and acts to detect the presence of an arcing condition between power line L and metal sheath S and, in turn, to switch solenoid SOL to its de-energized state. Second rectifier SCR2 preferably has a model number of IN4005 and acts to detect the presence of an arcing condition between neutral line N and metal sheath S and, in turn, to switch solenoid SOL to its de-energized state. Voltage dropping resistor R1 has a value of 1 Kohms and acts to drop the current leakage voltage produced from an arcing condition to an acceptable level before said current leakage voltage is passed onto first and second rectifiers SCR1 and SCR2. Isolation diode D1 preferably has a model number of IN4004 and serves to isolate the gate connection of first rectifier SCR1 for reverse transients. Isolation diode D3 preferably has a model number of IN4004 and serves to isolate the gate connection of second rectifier SCR2 for reverse transients. First protection diode D2 preferably has a model number of IN4004 and serves to protect the gate connection of first rectifier SCR1 from an overvoltage, or shunt, condition. Second protection diode D2 preferably has a model number of IN4004 and serves to protect the gate connection of second rectifier SCR2 from an overvoltage, or shunt, condition. First capacitor C1 has a value in the range of 2.2–6.6 uF and serves to filter out high frequency noise from passing onto the gate connection of first rectifier SCR1. Second capacitor C2 has a value of 0.1 uF and serves to filter out high frequency noise from passing onto the gate connection of second rectifier SCR2. Reset switch SW4 is a conventional push-in type switch and acts, when depressed, to remove holding current from the anode of first rectifier SCR1 and the cathode of second rectifier SCR2.

Filter circuit 825 acts to smooth out the varying DC voltage provided from the power supply and provide a filtered DC voltage to the power input of chip U1. Filter circuit 825 includes a voltage dropping resistor R10 which preferably has a value of 18 Kohms and acts to regulate the appropriate voltage supplied to chip U1. Filter circuit 825 also includes a DC filter capacitor C9 which preferably has a value in the range from 1.0–3.3 uF and acts to filter the ripple of the voltage supplied to chip U1.

Test circuit 827 provides a means of testing whether circuit 811 is functioning properly. Test circuit 827 comprises a current limiting resistor R11 having a value of 15 Kohms and a test switch SW3 of conventional push-in type design. When SW3 is depressed to energize test circuit 827, resistor R11 provides a simulated fault current to transformer T1 which is similar to a ground fault condition.

Indicator circuit 829 provides a means of visually indicating that switch 811 has tripped in response to a ground fault, grounded neutral or arcing condition. Indicator circuit 829 includes a silicon rectifier D10, a light emitting diode LED and a current limiting resistor R12. Rectifier D10 is preferably has a model number of IN4148 and acts to convert the AC power of the line to DC power for diode LED. Diode LED provides the visual indication of a tripped condition. Resistor R12 is preferably in the range of 15–47 Kohms and acts to limit the current which passes to diode LED.

In use, combined GFCI/fireguard circuit 811 functions in a similar manner. Prior to initial connection, switches SW1 and SW2 are normally in their first connective position. Upon initial connection of circuit 811 at one end to the load and at the other end to the power source, line voltage of approximately 120 volts is applied to solenoid SOL through booster circuit 819 and energizes solenoid SOL. Once solenoid is energized, solenoid SOL causes switches SW1 and SW2 to move into their second connective position, thereby eliminating the supply of power into solenoid SOL from booster circuit 819. However, since a constant 28 volts is supplied to solenoid SOL from power supply circuit 817, solenoid SOL is maintained in its energized state. With solenoid SOL maintained in its energized state, rectifiers SCR1 and SCR2 are in a non-conductive state and transistor Q1 is on, which enables a current to pass to solenoid SOL.

Upon the presence of a ground fault or grounded neutral condition, fault detection circuit 821 sends a current to rectifier SCR1 causing rectifier SCR1 to be in a conductive state which, in turn, turns off transistor Q1. With transistor Q1 off, current does not pass to solenoid SOL and therefore solenoid SOL becomes de-energized. Once de-energized, solenoid SOL causes switches SW1 and SW2 to return to its first connective position, thereby cutting off power from the power source to the load, which is highly desirable.

Upon the presence of an arcing condition between power line L and metal sheath S, leakage voltage travels from metal sheath S and passes through resistor R1, resistor R1 dropping the leakage voltage to an acceptable level. The reduced leakage voltage travels through both isolation diodes D1 and D3. However, due to the opposite polarities of rectifiers SCR1 and SCR2, the reduced leakage voltage only triggers the gate of first rectifier SCR1. Triggering of the gate of first rectifier SCR1 causes rectifier SCR1 to be in a conductive state which, in turn, turns off transistor Q1. With transistor Q1 off, current does not pass to solenoid SOL and therefore solenoid SOL becomes de-energized. Once de-energized, solenoid SOL causes switches SW1 and SW2 to return to its first connective position, thereby cutting off power from the power source to the load, which is highly desirable.

Upon the presence of an arcing condition between neutral line N and metal sheath S, leakage voltage travels from metal sheath S and passes through resistor R1, resistor R1 dropping the leakage voltage to an acceptable level. The reduced leakage voltage travels through both isolation diodes D1 and D3. However, due to the opposite polarities of rectifiers SCR1 and SCR2, the reduced leakage voltage only triggers the gate of second rectifier SCR2. Triggering of the gate of second rectifier SCR2 causes rectifier SCR2 to be in a conductive state which, in turn, turns off transistor Q1. With transistor Q1 off, current does not pass to solenoid SOL and therefore solenoid SOL becomes de-energized. Once de-energized, solenoid SOL causes switches SW1 and SW2 to return to its first connective position, thereby cutting off power from the power source to the load, which is highly desirable.

Once the particular fault/arcing condition is removed, circuit 811 can be reset by manually depressing switch SW4. Depression of switch SW4 causes current to pass through reset switch SW4 instead of rectifiers SCR1 and SCR2, which turns off rectifiers SCR1 and SCR2. This, in turn, turns transistor Q1 back on which enables solenoid SOL to become re-energized.

Figure 10:
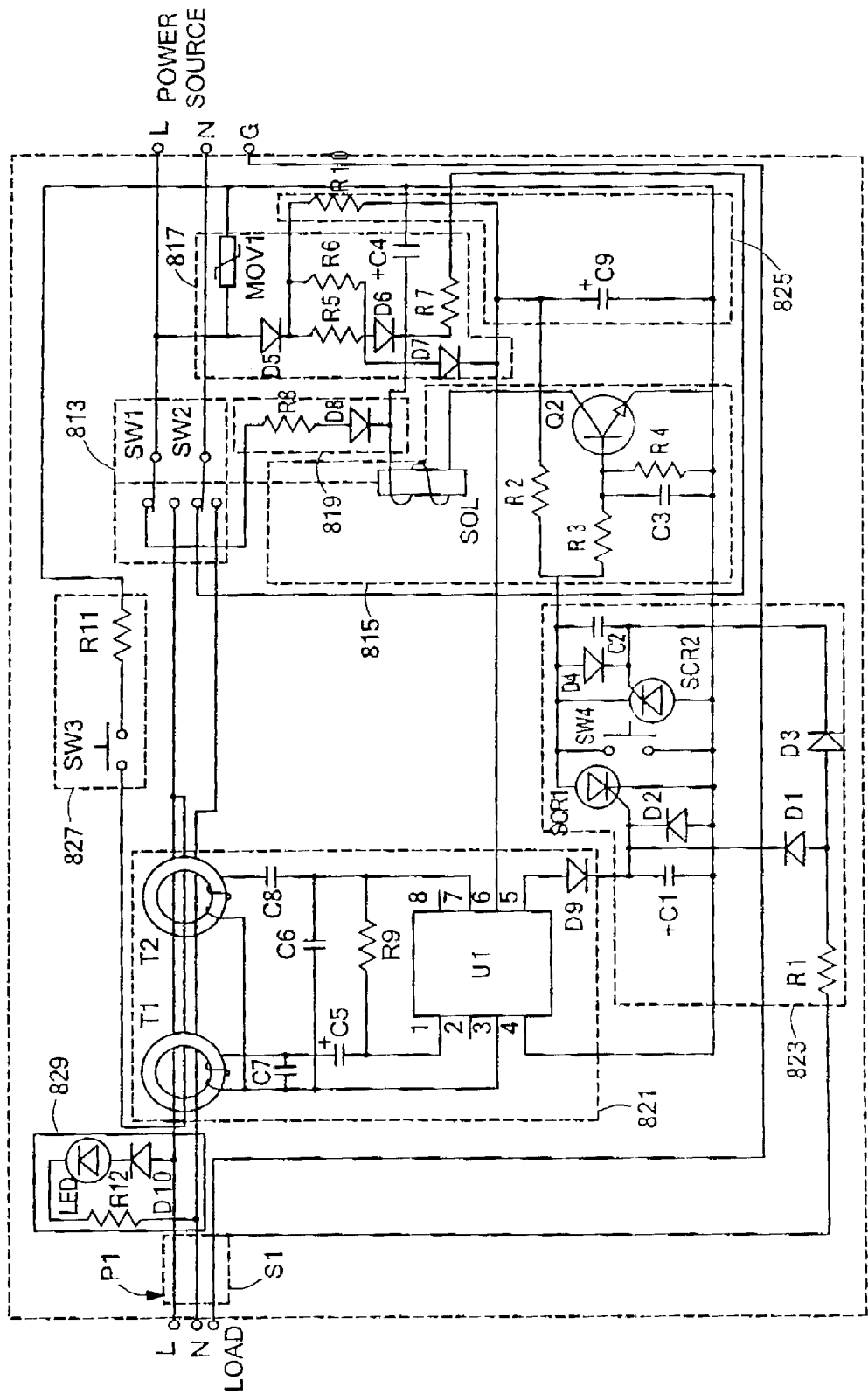
FIG. 10 is a schematic circuit diagram of a second embodiment of a combined fireguard circuit and ground fault circuit interrupter (GFCI) constructed according to the teachings of the present invention.

It should also be noted that, although the combined GFCI/fireguard circuit 811 is shown for use as a safety device for a power cable which comprises two conducting lines, it is to be understood that the combined GFCI/fireguard circuit 811 could also be used as a safety device for a power cable which comprises three conducting lines without departing from the spirit of the present invention. Specifically, referring now FIG. 10, there is shown a second embodiment of a combined GFCI/fireguard circuit constructed according to the teachings of the present invention, the combined GFCI/fireguard circuit being represented generally by reference numeral 911.

Combined GFCI/fireguard circuit 911 (which is also referred to herein simply as safety circuit 911) is identical in all respects with combined GFCI/fireguard circuit 811 except for the fact that combined GFCI/fireguard circuit 911 is designed principally for use as a safety device for a power cable P1 which includes three conducting lines whereas combined GFCI/fireguard circuit 811 is designed principally for use as a safety device for a power cable P which includes two conducting lines. Specifically, power cable P1 includes a power line L, a neutral line N and a ground line G. Power line L and neutral-line N are each wrapped with a metal sheath or other type of similar wrapping. The metal sheaths of power line L and neutral line N are then, in turn, twisted together so as to effectively form a single metal sheath Si which surrounds power line L and neutral line N. Ground line G remains electrically isolated from power line L and neutral line N.

The versions of the present invention described above are intended to be merely exemplary and those skilled in the art shall be able to make numerous variations and modifications to it without departing from the spirit of the present invention. All such variations and modifications are intended to be within the scope of the present invention as defined in the appended claims. For example, it should be noted that the particular components which make up the aforementioned embodiments may be interchanged or combined to form additional embodiments.

What is claimed is:

1. A fireguard circuit for use with a power cable, said power cable connecting a power source with a load, said power cable comprising a power line, a neutral line and a metal sheath which surrounds the power line and the neutral line, said fireguard circuit comprising:
    (a) a circuit breaker comprising a first switch located in one of said lines between the power source and the load, said switch having a first position in which the power source in its associated line is connected to the load and a second position in which the power source in its associated line is not connected to the load,
    (b) a circuit opening device for setting said switch in either its first position or its second position, said circuit opening device being operable in either a first state or a second state, said circuit opening device setting said switch in its first position when in its first state and said circuit opening device setting said switch in its second position when in its second state,
    (c) a first silicon controlled rectifier (SCR) for detecting the presence of an arcing condition between the power line and the metal sheath, said first SCR setting said circuit opening device at its second state upon detecting the presence of an arcing condition between the power line and the metal sheath, and
    (d) a second silicon controlled rectifier (SCR) for detecting the presence of an arcing condition between the neutral line and the metal sheath, said second SCR setting said circuit opening device at its second state upon detecting the presence of an arcing condition between the neutral line and the metal sheath.

2. The fireguard circuit of claim 1 wherein said first and second SCRs are connected in parallel.

3. The fireguard circuit of claim 2 wherein each of said first and second SCRs comprise an anode, a cathode and a gate.

4. The fireguard circuit of claim 3 wherein the anode of said first SCR is connected to the cathode of said second SCR and the cathode of said first SCR is connected to the anode of said first SCR.

5. The fireguard circuit of claim 4 wherein said first SCR switches said solenoid from its de-energized state to its energized state upon detecting the presence of an arcing condition between the power line and the metal sheath.

6. The fireguard circuit of claim 5 wherein said second SCR switches said solenoid from its de-energized state to its energized state upon detecting the presence of an arcing condition between the neutral line and the metal sheath.

7. The fireguard circuit of claim 6 wherein said circuit opening device is a solenoid.

8. The fireguard circuit of claim 7 wherein said solenoid is operable in either a de-energized state or an energized state, said solenoid setting said switch in its first position when in its de-energized state and said solenoid setting said switch in its second position when in its energized state.

9. The fireguard circuit of claim 4 comprising a voltage dropping resistor connected to the metal sheath.

10. The fireguard circuit of claim 9 comprising a first isolation diode and a second isolation diode, the anode of said first isolation diode being connected to said voltage dropping resistor and the cathode of said first isolation diode being connected to the gate of said first SCR, the anode of said second isolation diode being connected to said voltage dropping resistor and the cathode of said second isolation diode being connected to the gate of said second SCR.

11. The fireguard circuit of claim 10 further comprising a first filter capacitor and a second filter capacitor, the first filter capacitor having a first terminal connected to the gate of said first SCR and a second terminal connected to the cathode of said first SCR, the second filter capacitor having a first terminal connected to the gate of said second SCR and a second terminal connected to the cathode of said second SCR.

12. The fireguard circuit of claim 11 further comprising a first protection diode and a second protection diode, the anode of said first protection diode being connected to the cathode of said first SCR and the cathode of said first protection diode being connected to the gate of said first SCR, the anode of said second protection diode being connected to the cathode of said second SCR and the cathode of said second protection diode being connected to the gate of said second SCR.

13. The fireguard circuit of claim 8 wherein the switch in said circuit breaker is normally disposed in said first position.

14. The fireguard circuit of claim 13 wherein said circuit breaker further comprises a second switch located in the other of said lines between the power source and the load, said second switch having a first position in which the power source in its associated line is connected to the load and a second position in which the power source in its associated line is not connected to the load.

15. The fireguard circuit of claim 14 wherein said solenoid sets said first and second switches in their first position when in its de-energized state and sets said first and second switches in their second position when in its energized state.

16. A safety circuit for a power cable, said power cable connecting a power source with a load, said power cable comprising a power line, a neutral line and a metal sheath which surrounds the power line and the neutral line, said safety circuit comprising:

(a) a circuit breaker comprising a switch located in one of said lines, said switch having a first position in which the power source in its associated line is connected to the load and a second position in which the power source in its associated line is not connected to the load, (b) a circuit opening device for selectively moving and maintaining said switch in either said first position or said second position, said circuit opening device being operable in either a first state or a second state, said circuit opening device setting said switch in its first position when in its first state and setting said switch in its second position when in its second state, (c) a first silicon controlled rectifier (SCR) for detecting the presence of an arcing condition between the power line and the metal sheath, said first SCR setting said circuit opening device at its second state upon detecting the presence of an arcing condition between the power line and the metal sheath, (d) a second silicon controlled rectifier (SCR) for detecting the presence of an arcing condition between the neutral line and the metal sheath, said second SCR setting said circuit opening device at its second state upon detecting the presence of an arcing condition between the neutral line and the metal sheath, and (e) a fault detection circuit for detecting the presence of a fault condition in at least one line extending between the power source and the load, said fault detection circuit setting said circuit opening device at its second state upon detecting the presence of a fault condition in at least one line extending between the power source and the load.

17. A safety circuit for a power cable, said power cable connecting a power source with a load, said power cable comprising a power line, a neutral line and a metal sheath which surrounds the power line and the neutral line, said safety circuit comprising:

(a) a circuit breaker comprising a switch located in one of said lines, said switch having a first position in which the power source in its associated line is connected to the load and a second position in which the power source in its associated line is not connected to the load, (b) a circuit opening device for selectively moving and maintaining said switch in either said first position or said second position, said circuit opening device being operable in either a first state or a second state, said circuit opening device setting said switch in its first position when in its first state and setting said switch in its second position when in its second state, (c) a first silicon controlled rectifier (SCR) for detecting the presence of an arcing condition between the power line and the metal sheath, said first SCR setting said circuit opening device at its second state upon detecting the presence of an arcing condition between the power line and the metal sheath, (d) a second silicon controlled rectifier (SCR) for detecting the presence of an arcing condition between the neutral line and the metal sheath, said second SCR setting said circuit opening device at its second state upon detecting the presence of an arcing condition between the neutral line and the metal sheath, and (e) a fault detection circuit for detecting the presence of a fault condition in at least one line extending between the power source and the load, said fault detection circuit causing said first SCR to set said circuit opening device at its second state upon detecting the presence of a fault condition in at least one line extending between the power source and the load.

18. A safety circuit for a power cable, said power cable connecting a power source with a load, said power cable comprising a power line, a neutral line and a metal sheath which surrounds the power line and the neutral line, said safety circuit comprising:

(a) a circuit breaker comprising a switch located in one of said lines, said switch having a first position in which the power source in its associated line is connected to the load and a second position in which the power source in its associated line is not connected to the load, (b) a relay circuit for selectively moving and maintaining said switch in either said first position or said second position, said relay circuit comprising a circuit opening device which is operable in either a first state or a second state, said circuit opening device setting said switch in its first position when in its first state and setting said switch in its second position when in its second state, (c) a latch circuit for selectively controlling the operating state of said circuit opening device, said latch circuit comprising a first silicon controlled rectifier (SCR) and a second silicon controlled rectifier (SCR), said first SCR detecting the presence of an arcing condition between the power line and the metal sheath, said second SCR detecting the presence of an arcing condition between the neutral line and the metal sheath, said first SCR setting said circuit opening device at its second state upon detecting the presence of an arcing condition between the power line and the metal sheath, said second SCR setting said circuit opening device at its second state upon detecting the presence of an arcing condition between the neutral line and the metal sheath, and (d) a fault detection circuit for detecting the presence of a fault condition in at least one line extending between the power source and the load, said fault detection circuit causing said latch circuit to set said circuit opening device at its second state upon detecting the presence of a fault condition in at least one line extending between the power source and the load.

19. A fireguard circuit for use with a power cable, said power cable connecting a power source with a load, said power cable comprising a power line, a neutral line and a metal sheath which surrounds the power line and the neutral line, said fireguard circuit comprising:

(a) a circuit breaker comprising a first switch located in one of said lines between the power source and the load, said switch having a first position in which the power source in its associated line is connected to the load and a second position in which the power source in its associated line is not connected to the load, (b) a circuit opening device for setting said switch in either its first position or its second position, said circuit opening device being operable in either a first state or a second state, said circuit opening device setting said switch in its first position when in its first state and said circuit opening device setting said switch in its second position when in its second state, and (c) a silicon controlled rectifier (SCR) for detecting the presence of an arcing condition between one of said lines and the metal sheath, said first SCR setting said circuit opening device at its second state upon detecting the presence of an arcing condition between one of said lines and the metal sheath.

* * * * *